United States Patent
Den Hartog et al.

(10) Patent No.: US 8,406,167 B2
(45) Date of Patent: Mar. 26, 2013

(54) PROXY-BRIDGE FOR CONNECTING DIFFERENT TYPES OF DEVICES

(75) Inventors: Frank Theodoor Henk Den Hartog, Voorschoten (NL); Franklin Selgert, Berkel en Rodenrijs (NL); Archi Delphinanto, Delft (NL); António José Pinto Soares Madureira, Delft (NL)

(73) Assignee: Koninklijke KPN N.V., The Hague (NL)

( * ) Notice: Subject to any disclaimer, the term of this patent is extended or adjusted under 35 U.S.C. 154(b) by 836 days.

(21) Appl. No.: 12/308,018

(22) PCT Filed: Jun. 5, 2007

(86) PCT No.: PCT/EP2007/004960
§ 371 (c)(1),
(2), (4) Date: Aug. 11, 2009

(87) PCT Pub. No.: WO2007/140981
PCT Pub. Date: Dec. 13, 2007

(65) Prior Publication Data
US 2009/0303926 A1    Dec. 10, 2009

(30) Foreign Application Priority Data
Jun. 6, 2006   (EP) .................................. 06011614

(51) Int. Cl.
*H04W 92/00*   (2009.01)
(52) U.S. Cl. ........ 370/328; 370/401; 455/426; 455/41.1
(58) Field of Classification Search .................. 455/407, 455/408, 41.1, 41.2, 426.2, 428; 370/328, 370/338, 401; 709/208, 246
See application file for complete search history.

(56) References Cited

U.S. PATENT DOCUMENTS

| | | | |
|---|---|---|---|
| 7,840,798 B2 * | 11/2010 | Hagg et al. ..................... | 713/152 |
| 2001/0033554 A1 | 10/2001 | Ayyagari et al. | |
| 2002/0083143 A1 * | 6/2002 | Cheng .......................... | 709/208 |
| 2004/0098531 A1 * | 5/2004 | Hagg et al. ..................... | 710/315 |
| 2005/0169287 A1 * | 8/2005 | Krusche et al. ............... | 370/401 |
| 2005/0246726 A1 * | 11/2005 | Labrou et al. ................. | 719/328 |
| 2007/0220563 A1 * | 9/2007 | Wu ................................ | 725/81 |

OTHER PUBLICATIONS den Hartog et al, "Personal Networks Enabling Remote Assistance for Medical Emergency Teams" in Studies in Health Technology and Informatics, vol. 114, 2005, pp. 221-229.

(Continued)

*Primary Examiner* — Cong Tran
(74) *Attorney, Agent, or Firm* — McDonnell Boehnen Hulbert & Berghoff LLP (57) ABSTRACT

A proxy-bridge for connecting Universal Plug and Play (UPnP) compliant devices with Bluetooth (BT) compliant devices, and includes SSDP support for discovery of available UPnP compliant devices and services; a Bluetooth SDP client for discovery of available Bluetooth devices and available Bluetooth services and a Bluetooth SDP server for communicating with Bluetooth SDP clients in the available Bluetooth devices. The proxy-bridge has a converter for converting the discovered Bluetooth devices and services into associated UPnP device and service information, and the discovered UPnP compliant devices and services into associated Bluetooth device, service, and/or profile information. A device and service announcer advertises device availability at regular intervals. A UPnP adapter represents the Bluetooth devices towards the UPnP devices and a Bluetooth adapter represents the UPnP compliant devices towards the Bluetooth compliant devices.

9 Claims, 4 Drawing Sheets

OTHER PUBLICATIONS

Jun et al, "Controlling non IP Bluetooth devices in UPnP home network" in Advanced Communication Technology, 2004, pp. 714-718.

International Search Report for PCT/EP2007/004960, Sep. 25, 2012.
Written Opinion of the International Searching Authority for PCT/EP2007/004960, Sep. 25, 2012.

* cited by examiner

PROXY-BRIDGE FOR CONNECTING DIFFERENT TYPES OF DEVICES

BACKGROUND OF THE DISCLOSURE

1. Field of the Invention

The invention relates to a proxy-bridge for connecting Universal Plug and Play (UPnP) compliant devices with Bluetooth (BT) compliant devices. The invention also relates to a method and to a computer program product for enabling such connections.

2. Description of the Prior Art

As described in "Personal Networks Enabling Remote Assistance for Medical Emergency Teams", by F. T. H. den Hartog, J. R. Schmidt, and A. de Vries, in Studies in Health Technology and Informatics, Volume 114, 2005, pages 221-229, a Personal Area Network (PAN) can be defined as a network of devices in the personal operating space of the user. The user is, for instance, carrying a laptop, a personal digital assistant (PDA), a mobile phone, a wireless headset and a digital camera. The devices are, for instance, networked with each other by means of high-data-rate wireless personal area network (WPAN) technology (>200 kbps). The mobile phone, the laptop and the PDA can also communicate to the rest of the world by means of Universal Mobile Telecommunications System (UMTS) technology or Wireless Local Area Network (WLAN) technology. This configuration enables, e.g., pictures taken by the digital camera to be emailed by means of the email client on the PDA and the UMTS connection of the mobile phone.

A Personal Network PN (not to be confused with a PAN), is envisaged as the next step in achieving unlimited communication between people's electronic devices. A PN provides the technology needed to interconnect the various private networks of a single user seamlessly, at any time and at any place. Such private networks are PANs, home networks, car networks, company networks, and others. Often, a user wants to remotely access content, applications, or resources that are located in one of his private domains. For example, a business man who is at a conference wants to take pictures of the various speakers without having to worry where the pictures should be stored: on the memory card of the camera, the hard disc of the laptop, the content server in the office, or the desktop computer at home. A PN should solve the current limitations that inhibit (user-friendly) access to the personal devices that are not physically close to the user at the moment of need.

Various private and public infrastructures are involved in creating a PN. The PN itself is covering the multiple domains that should hide the underlying network and business complexity from the user. At the heart of the PN is the core-PAN, which is physically associated with the owner of the PN. The core-PAN consists of networked personal devices carried by the user. Depending on the location of the user, the core-PAN can interact with devices in its direct environment or with remote devices in the user's other private networks to create a PN. A key element of the core-PAN is therefore the PN Gateway (PNG). The PNG is the device that contains the functionality needed to create a PN from the core-PAN and the other private networks. This functionality might include, amongst others, local storage, local intelligence, multiple wireless (mobile) access network interfaces, and protocol bridging/proxying functionality. The PNG can be a single dedicated device, or added functionality of other devices in the core-PAN. In the example of the PAN as described before, the PNG functionality is distributed over the laptop, PDA, and mobile phone. Another important factor for enabling a fully functional PN will be the Personal Network Provider (PNP). The PNP is not a device or a specific application, but a new business role. It is basically the service provider offering the PN service and providing an operational environment to manage user, service, content and network related issues. For that purpose the PNP might use a service platform, which communicates with the PNG and offers service control functions that enable end users to easily gain and maintain access to services, while roaming between different interconnecting public infrastructures. For other service providers, the PNP can act as a one-stop shop for providing their services to the PN. The PNP could also take care of the billing, depending on the subscriptions with the various network and service providers, and on the authentication of the devices and content belonging to the PN.

It is becoming clear that PNs in practice not only consist of internet protocol (IP) domains (e.g., using the TCP/IP computer network protocols), but also of non-IP domains. Examples of non-IP domains are car networks and PANs that make use of Bluetooth. This situation raises interoperability problems as for seamless operation of a PN it is a requisite that devices and services present in the PN automatically learn about each other's presence and about ways to make use of each other's services. As far as IP domains are concerned, to a certain extend UPnP can be used for this purpose. For non-IP domains, another protocol has to be used. To that end, the Bluetooth specifications describe the Bluetooth service discovery protocol (SDP). For a heterogeneous PN comprising UPnP and Bluetooth devices to function seamlessly, UPnP and SDP must be bridged. One of the possibilities is to transport IP on top of Bluetooth, for which Bluetooth offers an interface, and run the UPnP stack on top of this. However, this requires 'light-weight' apparatuses such as headsets to run a full UPnP/TCP/IP stack, which is undesirable in practice due to cost constraints. Another possibility is to run UPnP without IP on top of Bluetooth, which still requires to run heavy protocols such as UPnP on light-weight devices.

Figure 1:
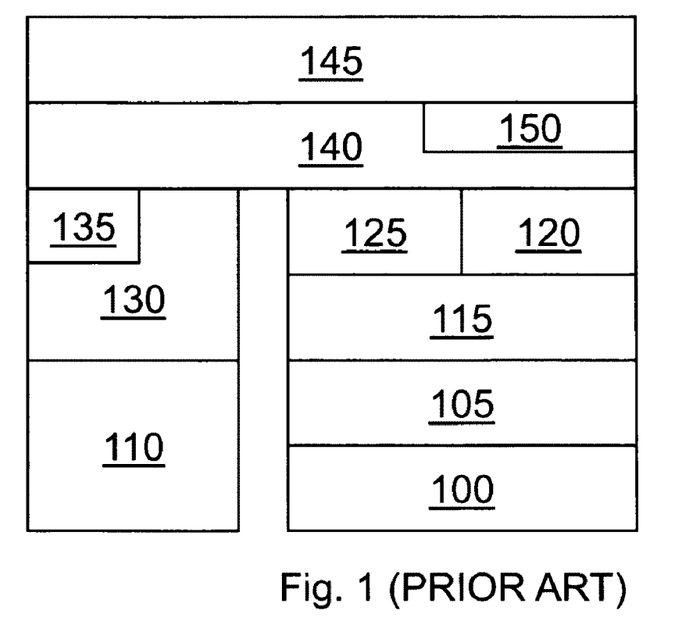
FIG. 1 illustrates a communication stack.

An example of the latter is US Patent Publication No. 2001/0033554 A1, which discloses remote control of devices in a piconet (an ad-hoc network of devices using BT protocol) by remote users communicating over the internet by providing a proxy-bridge device. Universal Plug and Play (UPnP) functionality is provided on top of the L2CAP layer of each Bluetooth (BT) device. Since L2CAP does not support networking functions between piconets, it limits the discovery of services to the active BT devices in a given piconet. Service discovery is extended by the UPnP functionality. In this system, the Service Discovery Protocol (SDP) provides service records indicating the availability of UPnP functionality in a BT device. The document discloses an exemplary BT compliant stack with additional details for providing support for various UPnP features in a suitably modified BT protocol stack. Support for HTTP and Extensible Markup Language (XML) is required for UPnP in the Bluetooth device in order to communicate with IP UPnP devices. A diagram of the communications stack implemented in the proxy-bridge device according to US 2001/0033554 A1 is shown in FIG. 1 herein. The proxy-bridge comprises a UPnP compliant application 145, a table of Bluetooth identifiers and the corresponding IP addresses 150, HTTP and XML 140, SDP 135, L2CAP 130, Bluetooth baseband link controller 110, TCP 125, UDP 120, Internet protocol network layer 115, data link layer 105, and physical layer 100. The document further discloses a proxy-bridge device for extending access to a device in a piconet by an external device residing outside the piconet, the proxy-bridge device comprising: a piconet protocol compliant stack for handling communications between proxy-bridge device and the device in the piconet; an external device compatible stack for handling communications between the proxy-bridge device and the external device; and a database associating an identifier of the piconet device with an external device compatible identifier employable by the external device for addressing the piconet device. It further discloses the proxy-bridge device further having a UPnP component associated with the piconet protocol compliant stack and the external device compatible stack. Herein, the UPnP component includes functionality for sending a service discovery request from the piconet device to the external device and sending a response to the service discovery request from the external device with a description of at least one service available in the piconet. The proxy-bridge device is a master device in the piconet and the piconet device is a slave in the piconet. The piconet protocol compliant stack conforms to BT specifications thereby enabling the proxy-bridge device to interoperate with other BT devices.

Figure 2:
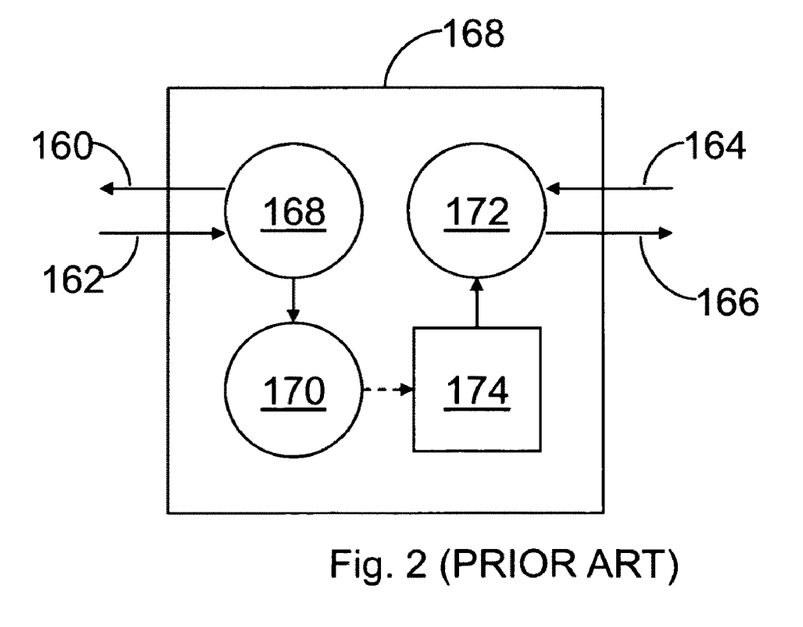
FIG. 2 illustrates an architecture of a proxy server.

In "Controlling non IP Bluetooth devices in UPnP home network", by Sun-Mi Jun and Nam-Hoon Park, in Advanced Communication Technology, 2004, referred to hereinafter as "Jun et al", a method for controlling non IP Bluetooth devices in a UPnP home network is disclosed. Jun et al present a UPnP-Bluetooth proxy server to assist the non-IP Bluetooth devices to be connected and controlled on UPnP home networks. The bridge proposed in Jun et al is schematically represented in FIG. 2. The UPnP-Bluetooth proxy server 168 comprises a UPnP message processor 172 receiving 164 service discovery multicast messages and control messages from a UPnP control point through HTTP and transmitting 166 UPnP messages. It also comprises a Bluetooth device discoverer 168 for getting service records of the Bluetooth devices within the piconet using SDP requests 160 and SDP results 162, and passing the service records to a UPnP description generator 170. It also comprises a description table 174 containing the service records of the Bluetooth devices such as Service Name, Device UUID, and Service Handle. The IP port numbers of the proxy server should be mapped to each Bluetooth device to be recognized by a node outside of the Bluetooth piconet. The description table also contains the device descriptions and the service descriptions to be utilized by UPnP middleware. It also comprises a description generator for creating the description table using the results of Bluetooth device discoverer and converting the table to XML documents. Although the description generator creates the device and service descriptions as a form of XML, the system cannot write all items required by the UPnP system in the table as SDP cannot provide access, brokering, and controls of services, but only availability of services and the characteristics of those available services. Therefore, the proxy server also comprises a description table editor for filling in the action fields of the description table in order to execute programs to utilize services of the Bluetooth devices. The editor provides users a mean to configure the description table for utilizing services. The user here is meant to be the administrator of the proxy server.

The description generator of Jun et al uses SDP to get the fields available in SDP. Several fields required in the UPnP description of the device are not available in the SDP results. In particular, the service description URL, the control URL, and the event URL cannot be extracted from the SDP results. Also the fields relating to UPnP service description cannot be extracted from the SDP results. The description generator fills in some of these attributes as follows. The Service Description URL is the HTTP location of the UPnP service description stored in the proxy server. The Control URL is the HTTP location receiving the messages from UPnP control points, specified by a UPnP vendor and registered by the proxy server's administrator. The Event Sub URL field is related to the UPnP events, specified by a vendor, and unique for a device. If a service has no event, this field should be empty.

A Bluetooth master and a device composing a connection unit have a pair of application programs for connecting each other. The application program may be a profile defined by Bluetooth SIG or a customizing application. The UPnP-Bluetooth proxy server of Jun et al, which is operated as a Bluetooth master, has some programs for accessing its slave devices. This server also knows the execution locations of the programs and the arguments passed to the execution programs. These execution locations and arguments should be recorded to the action and arguments fields of the UPnP service description. In a Bluetooth piconet, Bluetooth devices send events to their Bluetooth master whenever the states of those are changed. To process the events of the Bluetooth devices on UPnP network, the UPnP-Bluetooth proxy server's administrator defines the state variable mapped to each event of a the Bluetooth device, and registers the variables and their attributes to the state variables fields of the UPnP service description. After the administrator's configuration, if a Bluetooth device sends an event relating to a state change, the mapping state variable of the UPnP service description should be modified and the result is send to the UPnP control point via the Event Sub URL.

The systems disclosed in the prior art are not capable of connecting all existing combinations of UPnP devices and Bluetooth devices. Some require a more complex communication stack in the Bluetooth devices. Moreover, they require manual maintenance and are relatively inefficient in keeping the devices up-to-date regarding available devices.

SUMMARY OF THE INVENTION

It is an object of the invention to provide a proxy-bridge with an improved and more efficient interoperability of Bluetooth devices and UPnP devices.

This and other objects are realized by providing a proxy-bridge for connecting UPnP compliant devices with Bluetooth compliant devices, that includes a first communication stack for communication with UPnP compliant devices and a second communication stack for communication with Bluetooth compliant devices in a piconet, including a Bluetooth SDP client for discovery of available Bluetooth devices and available Bluetooth services. The proxy-bridge includes a converter for converting the discovered Bluetooth devices and services into associated UPnP device and service information, also in dependence on respective profiles of the discovered Bluetooth devices and services and on predefined properties associated with the profiles. The proxy-bridge also includes a device and service announcer for distributing the associated UPnP device and service information by advertising at regular intervals and a UPnP adapter for representing the Bluetooth devices towards the UPnP devices thereby converting and forwarding messages relating to invocations and service state variables between the UPnP device and the Bluetooth device, based on an output of the converter.

By advertising at regular intervals, the UPnP devices are kept up-to-date with regard to the available Bluetooth devices and services. This avoids the need for the UPnP devices to poll for available devices and services, making the proxy-bridge more efficient. The proxy-bridge according to the invention is not a purely passive device that only reacts to incoming messages. The improved proxy-bridge also initiates communication, for example announcement messages to broadcast the available devices and services in the piconet.

By using the predefined properties of Bluetooth profiles, a table can be generated mapping the standardized properties to UPnP device and service description fields. Each standardized and/or proprietary Bluetooth profile is associated with a set of UPnP device and service description fields in a table stored in the proxy-bridge's memory. The Bluetooth device has an application running on it. The proxy-bridge may run a corresponding application for interfacing with the application on the Bluetooth device. In this case the UPnP service description fields may comprise function calls and arguments to the corresponding application on the proxy-bridge.

The table can be updated, for example by accessing a remote server or by loading and executing an update program from a physical medium, for adding support for new types of Bluetooth devices. This has the advantage, that UPnP description fields that do not have a suitable counterpart in the Bluetooth standard, can be filled in by referencing the table. This mechanism can also be used for uploading and configuring extra, more service specific information needed for accessing, invoking, and/or using the service.

An embodiment of the present invention includes a device and service discoverer for regularly causing the Bluetooth SDP client to poll for the presence of the available Bluetooth devices and the available Bluetooth services. This embodiment is another example of active behavior of the proxy-bridge: it keeps its list of available Bluetooth devices and services up-to-date by regularly polling the Bluetooth devices. The frequency of polling can be chosen based on the need to keep the list up-to-date and the need to save communication bandwidth and to save energy consumed by Bluetooth (battery-operated) devices. Individual Bluetooth devices can, after they have become available, be polled at respective individually determined intervals to check their continued presence in the piconet and to check for the available services on the device.

The information about available Bluetooth devices and the distribution of that information to the UPnP devices is performed separately. The proxy-bridge is not a passive proxy-bridge that only converts and immediately forwards the information it receives, but rather an active proxy-bridge that actively collects information about the available devices and services and actively distributes the information. Preferably, information about newly detected devices and disappeared devices is periodically advertised so that the information is on the one hand distributed within a reasonable time interval, while on the other hand avoiding unnecessary use of bandwidth. Also it is prevented that a device that frequently appears in and disappears from the Bluetooth network is constantly announced in the UPnP network as having become available and/or unavailable, and vice versa. To this end, it is possible to delay advertisement of a disappearing Bluetooth device for a predetermined, configurable time duration.

Another embodiment of the present invention has an input for receiving from a remote management/configuration server via a network information relating to the predefined properties of the profiles. The network can comprise a mobile telephony network based on for example GMS, UMTS, GPRS or a network such as Wi-Fi or the Internet. The server can be operated by a mobile telecommunications service provider or an internet service provider. The configuration makes it possible to add easily support for new profiles as they become available. For example, the proxy-bridge could, in first instance, only have information relating to the most popular types (or any collection) of Bluetooth compliant devices. Whenever an unknown type of Bluetooth device/service/profile is found in the piconet, the proxy-bridge accesses the server via the network to obtain the information relevant for making the services provided by the Bluetooth compliant device available to UPnP compliant devices. This feature reduces proxy-bridge memory requirements and does not need manual intervention by the administrator/user. This mechanism can also be used for uploading and configuring extra, more service specific information needed for accessing, invoking, and using the service. Examples of such information are the pair code for authentication and specific settings for using the devices in a specific context of piconet such as within a company's premises.

Yet another embodiment of the present invention discovers that at least one of the Bluetooth compliant devices is no longer available; and has a device and service announcer arranged for distributing UPnP unavailability information after the at least one of the Bluetooth devices has become unavailable. This embodiment makes sure that a UPnP device using or intending to make use of a Bluetooth device is notified of the disappearance of the Bluetooth device. This enables the UPnP device to stop trying to use the device, making the system more efficient. The proxy-bridge may be configured to distribute the unavailability information immediately when it becomes available (to help the other devices to keep their information up-to-date), or only after a predetermined time interval (thereby avoiding distributing unavailability information if the device disappears only for a short time duration), or at regular time intervals (avoiding distributing the unavailability information if the device disappears only for a short time duration, and enabling the possibility to combine the distribution of disappearance information with the distribution of availability information).

In an embodiment of the present invention, the converter is arranged for hierarchically representing a plurality of the available Bluetooth devices as a plurality of associated UPnP devices and/or services within a single UPnP root device. This embodiment has the advantage, that only a single IP address is required for addressing a plurality of Bluetooth devices. The proxy-bridge becomes more efficient with respect to computation time, complexity, and network traffic, because only a single UPnP root device is queried instead of a plurality of UPnP root devices associated with a plurality of IP addresses. For example, all Bluetooth devices within a single piconet could be grouped under the same UPnP device or UPnP root device. In another example, all Bluetooth devices discovered by the proxy-bridge (possibly covering a plurality of piconets) are represented by a single UPnP device or UPnP root device.

According to another aspect of the invention, the proxy-bridge comprises a Bluetooth SDP server in the second communication stack for communicating with Bluetooth SDP clients in the available Bluetooth devices; an SSDP support in the first communication stack for discovery of available UPnP compliant devices and services; and a Bluetooth adapter for representing the UPnP compliant devices towards the Bluetooth compliant devices, thereby converting and forwarding messages relating to invocations from the Bluetooth compliant devices to the UPnP compliant devices, and converting and forwarding messages relating to service state variables from the UPnP compliant devices to the Bluetooth compliant devices using the output of the converter. In this embodiment, the converter is arranged for converting the discovered UPnP compliant devices and services into associated Bluetooth device, service, and/or profile information. Also, a device and service announcer is arranged for distributing the associated Bluetooth device and service information via the Bluetooth SDP server.

According to another embodiment of the present invention, the proxy-bridge provides for connecting UPnP compliant devices with Bluetooth compliant devices, and has a first communication stack for communication with UPnP compliant devices, including SSDP support for discovery of available UPnP compliant devices and services. In this embodiment, a second communication stack communicates with Bluetooth compliant devices in a piconet, and includes a Bluetooth SDP server for communicating with Bluetooth SDP clients in the available Bluetooth devices. There is also a converter for converting the discovered UPnP compliant devices and services into associated Bluetooth device, service, and/or profile information. Furthermore, a device and service announcer distributes the associated Bluetooth device and service information by BT devices in the piconet querying the Bluetooth SDP server. A Bluetooth adapter represents the UPnP compliant devices towards the Bluetooth compliant devices, thereby converting and forwarding messages relating to invocations from the Bluetooth compliant devices to the UPnP compliant devices, and converting and forwarding messages relating to service state variables from the UPnP compliant devices to the Bluetooth compliant devices using the output of the converter.

These invention embodiments enable a Bluetooth compliant device to receive information about available UPnP compliant devices and services. It also enables the Bluetooth compliant device to use the UPnP compliant devices and services and to receive information about the values of service state variables. Therefore, in combination with the above mentioned embodiment comprising the UPnP adapter, a two-way proxy-bridge is realized.

Another embodiment has the capability for discovering that at least one of the UPnP devices is no longer available and a device and service announcer arranged for timing out invocations from the Bluetooth compliant devices corresponding to a service of the at least one of the UPnP devices that is no longer available.

In another embodiment, the converter is arranged for hierarchically representing a plurality of the available UPnP devices and/or services as a plurality of Bluetooth services within a single Bluetooth device. In this embodiment, the Bluetooth devices need only query a single Bluetooth device to learn about services available by means of the proxy-bridge. This reduces the amount of required network bandwidth, computation time, and power consumption of the Bluetooth devices.

In another embodiment, an additional converter is arranged for hierarchically representing a plurality of the available UPnP devices as a plurality of Bluetooth devices, each having its own Bluetooth device identifier. For example, each available UPnP device and/or each available UPnP service may be represented by a different Bluetooth device, or each available UPnP device (with UPnP services) may be represented by a single Bluetooth device (with respective services).

According to another embodiment of the present invention, a proxy-bridge is provided for connecting UPnP compliant devices with Bluetooth compliant devices. The proxy-bridge includes a first communication stack for communication with UPnP compliant devices including SSDP support, for discovery of available UPnP compliant devices and services, and a second communication stack for communication with Bluetooth compliant devices in a piconet, including a Bluetooth SDP client for discovery of available Bluetooth devices and available Bluetooth services, and a Bluetooth SDP server for communicating with Bluetooth SDP clients in the available Bluetooth devices. The proxy-bridge of this embodiment also has a converter for converting the discovered Bluetooth devices and services into associated UPnP device and service information, also in dependence on respective profiles of the discovered Bluetooth devices and services and on predefined properties associated with the profiles; and for converting the discovered UPnP compliant devices and services into associated Bluetooth device, service, and/or profile information. The proxy-bridge of this embodiment also has a device and service announcer for distributing the associated UPnP device and service information by advertising at regular intervals and for distributing the associated Bluetooth device and service information via the Bluetooth SDP server. Furthermore, the embodiment has a UPnP adapter for representing the Bluetooth devices towards the UPnP devices, thereby converting and forwarding messages relating to invocations and service state variables between the UPnP device and the Bluetooth device, based on an output of that converter. A Bluetooth adapter represents the UPnP compliant devices towards the Bluetooth compliant devices, thereby converting and forwarding messages relating to invocations from the Bluetooth compliant devices to the UPnP compliant devices, and converting and forwarding messages relating to service state variables from the UPnP compliant devices to the Bluetooth compliant devices using the output of the converter.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in a proxy-bridge for connecting UPnP compliant devices with BT compliant devices.

Figure 3:
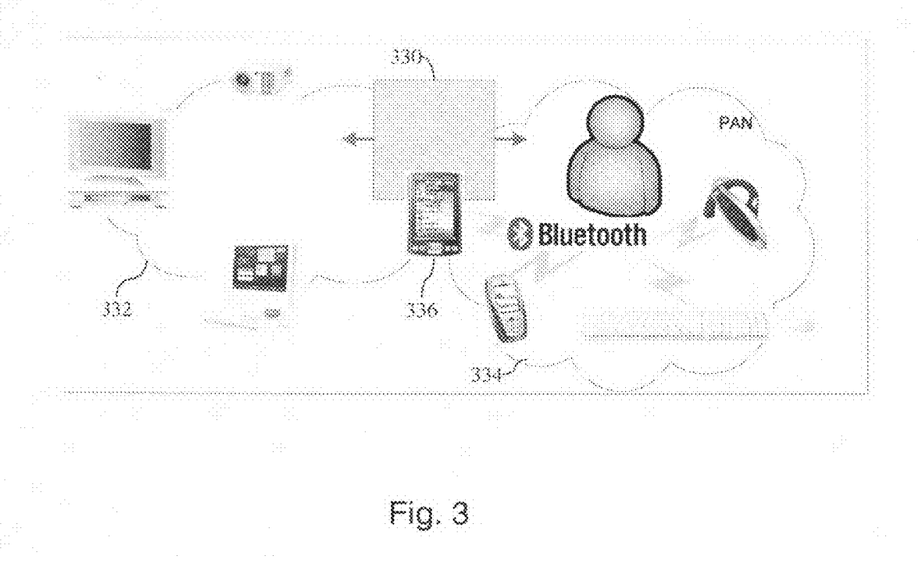
FIG. 3 illustrates a context of use of a proxy-bridge device.

Bridging and intelligent routing as provided for in the present invention, creates a transparent domain for service- and device discovery and access in the IP-enabled part of a Personal Network. Proxy servers employing the present invention will extend the range of the protocols to non-IP domains, such as the Personal Area Network (PAN) or the car network. In FIG. 3, a proxy-bridge device 330 is shown. The proxy-bridge device could for example be embedded in a PDA 336, in a (mobile) phone, in a personal computer, or it could be a dedicated proxy-bridge device. The proxy-bridge 330 connects UPnP devices such as television, personal computer, beamer, in a TCP/IP network 332 with Bluetooth devices such as a headset, a mobile phone, a keyboard or mouse, in a Bluetooth network 334. The embodiments disclosed herein propose an architecture and implementation of such a server or proxy-bridge 330. It connects a (non-IP) Bluetooth piconet with a UPnP-enabled IP network and provides proxy services on three different levels:

It enables UPnP devices to be discovered on the Bluetooth network and vice versa.

It enables UPnP services to be discovered on the Bluetooth network and vice versa.

It allows Bluetooth devices and UPnP control points to access services located on devices in the IP network and the piconet, respectively.

The present invention desirably achieves an objective that all functionality needed for effective proxying can be kept within a single physical device. The proxy server, employing the present invention, extracts all relevant information provided by the Bluetooth SDP and the UPnP device descriptions, and translates them into each other. There are no additional stacks or software needed on the other devices in the piconet (or IP network). This enables the discovery on both networks of not only complex devices, but also very simple ones, such as headsets and toys.

Hereinafter, the words 'bridge', 'proxy', and 'proxy-bridge', will be used interchangeably. In particular a bridge can be understood as having some or all of the functionality also usually found in a proxy or proxy server.

A number of standard Bluetooth services do not have clearly corresponding UPnP services, and vice versa. As a consequence, the match between Bluetooth profiles and UPnP standards is sometimes impossible, or only possible for part of the functionality. To reach a maximum interoperability, the proxy can be configured to run all Bluetooth profiles and UPnP standard implementations that currently exist. New profiles, standards, and service adaptation modules could be provided by means of remote management, by means of a standardized upgrading mechanism, or by means of a software upgrade. The software upgrade might be sold together with the device implementing the new profile, standard, or service. In an exemplary usage of the bridge, a Bluetooth headset, when it comes in the range of the bridge, is automatically recognized using the Bluetooth protocol. A corresponding UPnP device description is presented to UPnP devices on the IP network. For example, a VoIP phone with UPnP support is notified of the presence of the headset, and can present an end user with the option to make a call by means of the headset. The bridge also enables music files on a UPnP hard disc to be discovered and accessed by a Bluetooth MP3 player that supports Bluetooth storage media.

The performance of the proxy is influenced by the service discovery and initiation times and the data throughput. One way of measuring these is as a function of available proxy resources (CPU usage and memory). From this it can be concluded that the proxy software can easily run on current standard mobile devices, probably even without considerable impact on the other applications running on the device.

Features

The proxy's main features are to provide discoverability and accessibility of services between two different device communities applying incompatible service discovery protocols, i.e., UPnP and Bluetooth (piconet). The discoverability feature enables four service-discovery operations. Firstly, shows that a Bluetooth client in the Bluetooth community (so called piconet) is able to discover services provided by UPnP devices in the UPnP community. Secondly, a Bluetooth server in the piconet is able to advertise its services to any control points in the UPnP community. Thirdly, a control point in the UPnP community is able to discover any services in the piconet. Finally, a device in the UPnP community is able to offer its services to Bluetooth clients in the piconet.

Furthermore, the accessibility feature of the proxy enables transparent operations for service utilization. The proxy maintains the original contexts of service utilizations in Bluetooth and UPnP. The Bluetooth SDP does not define standard service utilizations; however, Bluetooth has several standard services' use cases that are standardized as Bluetooth profiles. Each of the Bluetooth profiles may have different ways and additional components to utilize the service and may include ways to deliver the service content. While in the UPnP, the protocol defines service utilizations as ways to share controls, to retrieve attributes, and to subscribe events of the service. Furthermore, the UPnP protocol does not define ways to deliver contents of the service. Delivering the content between UPnP devices such as delivering audio or video content will need particular streaming (non-UPnP) protocol.

Hence, applying those contexts in the proxy implies non-symmetrical service-utilizations, including the following. Firstly, a Bluetooth client in the piconet is able to utilize UPnP services based on Bluetooth profile specifications or customized library. Preferably, the Bluetooth's profile or customized library should be priory installed in the proxy. In the UPnP community the proxy finds UPnP services that match with one of the profiles, and when the content delivery is needed some additional protocols related to this need are pre-installed, for example TCP/IP to and from L2CAP data packet forwarding. Secondly, an UPnP control-point can utilize Bluetooth services as in the UPnP context discussed previously. Relevant Bluetooth profiles or customized applications are supported in the proxy to represent UPnP operations (i.e., invoke an action, query state-variable, and event notification).

In the implementation viewpoint, the proxy-bridge is seen as a UPnP root device that contains several embedded UPnP devices, each UPnP device corresponding to a Bluetooth device. Conversely, the proxy is seen as a Bluetooth server that provides several Bluetooth services, each Bluetooth service corresponding to a UPnP device and/or service.

Architecture

Figure 4:
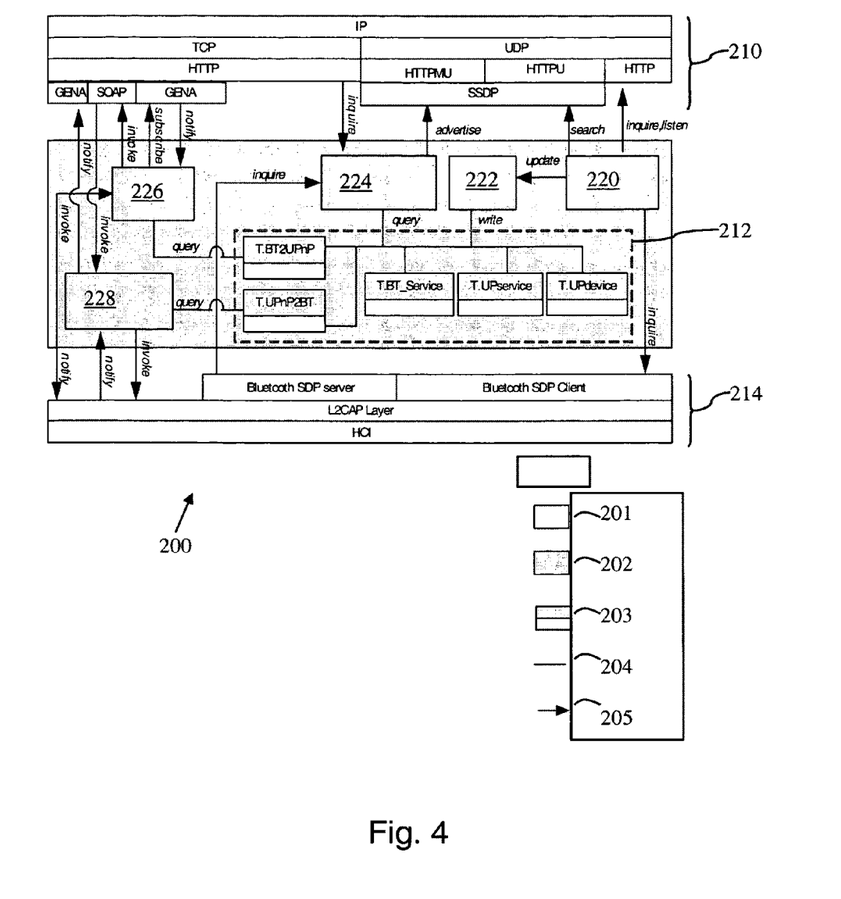
FIG. 4 illustrates an architecture of a proxy-bridge device.

FIG. 4 shows an example architecture of an embodiment of the UPnP-Bluetooth bridge 200. The proxy-bridge 200 architecture has five basic components, two service-discovery protocol components, and several tables that compose a database. The basic components are device and service discoverer 220, converter 222, device and service announcer 224, UPnP adapter 228, and Bluetooth adapter 226. The service-discovery protocol components implement Bluetooth SDP stack 214 and UPnP protocol stack 210 according to the Bluetooth and UPnP standards, respectively. The database 212 contains five functional tables namely T.UPdevice, T.UPservice, T.BTservice, T.UPnP2BT, and T.BT2UPnP. FIG. 4 shows protocol implementation elements on a white background 201, custom implementation elements on a gray background 202, and tables on a gray-and-white background 203. Database primitives are indicated by lines 204, and directive component primitives are indicated by arrows 205. The following is the explanation of each basic component and the database, starting from the component to discover and advertise services and ending with the component to utilize services.

Device and Service Discoverer Component (Discoverer)

The discoverer 220 is responsible for discovering available services and for detecting services that become unavailable in the Bluetooth and UPnP communities. Additionally, the service discovery can be adjusted or limited only to the ones that are meaningful. Meaningful means that a discovered service in one protocol has a corresponding service in the other protocol. This information is important later for service utilization. To obtain Bluetooth services in the Bluetooth community, the discoverer implements Bluetooth SDP application profile. With this profile, the proxy interfaces with the local Bluetooth SDP client to send service inquiries to and receive service inquiry responses from the SDP servers of remote devices. To obtain UPnP device and its services, the proxy will implement active and passive discovery of UPnP. Actively, the proxy uses Simple Service Discovery Protocol (SSDP) to discover UPnP devices and their descriptions.

Then from the description, the proxy can obtain the location of the supported services and the proxy will retrieve description of one or more service descriptions using HTTP (i.e., GET) method. Passively, the proxy's control point will receive and select desired UPnP device advertisement by listening to the multicast channel and port reserved for SSDP (i.e., 239.255.255.250:1900). Furthermore, those two service discovery processes are carried out independently in two different time periods that can be adjusted according to the need. Finally, the next function of the discoverer is to detect a service unavailability. In the Bluetooth community, the unavailability is detected by link disconnection or when the service gets expired, while in the UPnP community, the unavailability is detected by receiving an SSDP:byebye message or when a service life time expires. Furthermore, the discoverer generates several outputs such as Bluetooth SDP result, UPnP discovery result (i.e., device and service description), and service unavailability information. These outputs are then passed to the converter.

Converter Component

The converter 222 is responsible for generating and updating current information of Bluetooth and UPnP devices and services. The converter 222 receives three inputs from the discoverer 220. The first input is a new discovered Bluetooth device and service description. Thereafter, the converter 222 will convert the information into two UPnP descriptions, i.e., UPnP embedded device and corresponding service descriptions. However, often the obtained Bluetooth information is insufficient to generate the UPnP service description. Several ways to fill in the lacking information have been proposed in Jun et al. The obtained Bluetooth device and service information will be written into table UPnP device (i.e., T.UPdevice) and table UPnP service (i.e., T.UPservice). Based on the Bluetooth library and the UPnP device and service information, the converter 222 will fill in the table T.UPnP2BT. In this table every Bluetooth service has a corresponding ControlURL, every Bluetooth ProfileName has a corresponding ServiceType, every Bluetooth primitive has a corresponding ActionName, every Bluetooth primitive's argument has a corresponding ArgumentName and every Bluetooth profile's variable has a corresponding VariableName. The second input is a new UPnP device and service description, with these information the converter will generate corresponding Bluetooth service attributes and add this as a new service record into table Bluetooth service (i.e., T.BTservice). Based on the UPnP device and service description and pre-installed Bluetooth library, the converter will fill in the table T.BT2UPnP. In this table, every UPnP service (ServiceType) has a ControlURL and it is related with a Bluetooth ProfileName, every UPnP service action (ActionName) is related with a Bluetooth ActionName (Bluetooth profile's primitive), every UPnP service action argument (ArgumentName) is related with a Bluetooth ArgumentName, and finally every UPnP service state variable (VariableName) is related with a Bluetooth VariableName. The third input is unavailability information: the converter will remove the disappearing Bluetooth or UPnP device from the relevant table.

The mapping between Bluetooth SDP services descriptions and UPnP services descriptions can be explained as follows. A typical example of a Bluetooth device is a headset device offering a headset service. A typical example of an UPnP device is a TV device offering services such as television control or television presentation. One skilled in the art will appreciate after considering these examples that the definition of devices and services is different in Bluetooth and UPnP. A Bluetooth service can be seen as an UPnP device. An UPnP service can be seen as a part of a Bluetooth service. In UPnP a service is defined by a service state table that contains a list of variable names, type of variables, default values, and admitted values. In Bluetooth there is no specification of how a service is defined.

Figure 5:
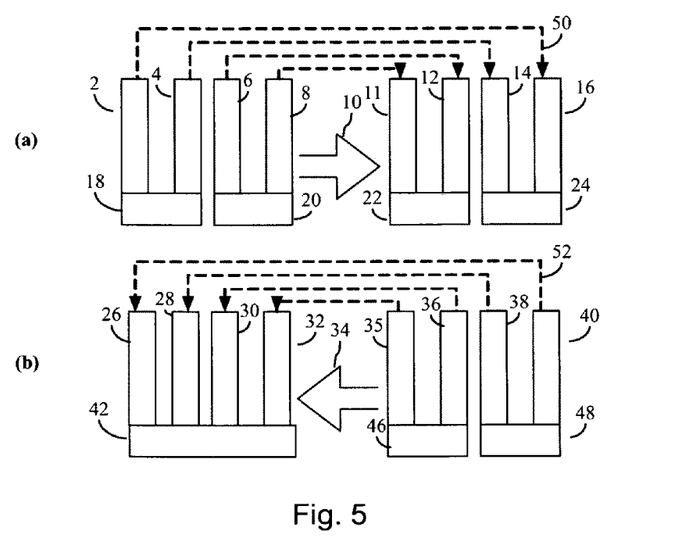
FIG. 5 illustrates a mapping of UPnP and Bluetooth devices.

Different possibilities exist to represent Bluetooth services in the UPnP network. FIG. 5 illustrates an embodiment in which one UPnP root device is simulated by the bridge. The UPnP root device is composed by a group of UPnP embedded devices 22, 24, each one associated with a Bluetooth device 20, 18 member of the piconet. Each UPnP embedded device 22, 24 is composed by a group of UPnP services 11, 12 and 14, 16, each one associated with a Bluetooth service (2, 4, 6, 8 as indicated by dashed arrows 50) offered by the corresponding Bluetooth device. This way has the advantage that the Bluetooth devices can be distinguished by the UPnP devices, while still having to address a single IP address with a single UPnP root device.

A way to show Bluetooth services in the UPnP network is shown in Tables 1a-1c. Referrals to another table indicate that this field points to one or more records of the type illustrated in that other table. The column "derived by" indicates how the fields are filled in. Fields labeled "bridge" in the column "derived by" are filled in by the bridge and are not directly related with Bluetooth services information. Fields labeled "SDP" can be directly extracted by the information given by the Bluetooth SDP about the Bluetooth services. Fields labeled "X" indicate UPnP fields that are related to the way services are defined in the UPnP context. This information is not given by the Bluetooth SDP. Bluetooth devices/services with a standardized profile have known properties, on the basis of which the unknown fields can be filled in. Otherwise, the bridge may fill in the fields based on knowledge it has about particular Bluetooth devices and/or services.

TABLE 1a

| Root device (bridge) | Derived by |
| --- | --- |
| specVersion | Bridge |
| URLBase | Bridge |
| friendlyName | Bridge |
| manufacturer | Bridge |
| modelDescription | Bridge |
| /modelName | Bridge |
| UDN | Bridge |
| iconList | Bridge |
| deviceList (see Table 1b) | Bridge |
| presentationURL | Bridge |

TABLE 1b

| UPnP embedded device (Bluetooth device) | Derived by |
| --- | --- |
| specVersion | Bridge |
| URLBase | Bridge |
| friendlyName | Bridge |
| manufacturer | Bridge |
| modelDescription | Bridge |
| modelName | Bridge |
| UDN | Bridge |
| iconList | Bridge |
| serviceList (see Table 1c) | |
| Presentation URL | Bridge |

TABLE 1c

| UPnP service (Bluetooth service) | Derived by |
|---|---|
| serviceType (Service Class ID) | SDP |
| serviceID (Service ID or Service Record Handle) | SDP |
| SCPDURL | Bridge |
| controlURL | Bridge |
| eventSubURL | Bridge |
| actionList | X |
| serviceStateTable | X |

An alternative embodiment assigns each Bluetooth device to a distinct UPnP root device (with its own IP address). Other solutions are mapping all the Bluetooth services to UPnP services within a single UPnP device, or even mapping each Bluetooth service to an UPnP device.

Assisted by a Bluetooth profile, in any of these embodiments, the proxy-bridge may fill in the fields standardized in an UPnP device/service description: UDN, Service ID, SCPDURL, controlURL, eventSubURL, Service Record Handle, Service Class ID List, Service Record State, Service ID, Browse Group List, Language Base Attribute, Service Info Time To Live, Service Availability, Documentation URL, Client Executable URL, Icon URL, Service Name, Service Description, Provider Name.

Similarly different possibilities exist to represent UPnP devices/services in the Bluetooth piconet. In the embodiment of FIG. 5, all the available UPnP services 35, 36, 38, 40 of all the UPnP devices 46, 48 are represented by the proxy-bridge as a single Bluetooth device 42. Each UPnP service 35, 36, 38, 40 is mapped 52 to a Bluetooth service record 32, 30, 28, 26 within the Bluetooth device 42. This way, the Bluetooth devices in the piconet need only to query a single Bluetooth device (a single Bluetooth interface in the proxy-bridge) to obtain all the information about all available UPnP services. This saves bandwidth and power.

A way of showing UPnP services in the Bluetooth piconet is shown in Tables 2a-2b. In this embodiment, the bridge acts as a single Bluetooth device, offering a group of Bluetooth services, each one associated with an UPnP service. The column "derived by" indicates how the fields are filled in. The fields labeled "bridge" in column "derived by" are fields that can be filled in by the bridge and are not directly related with UPnP services information. The fields labeled "SDP" are fields that can be directly extracted by the information given by the UPnP devices and services descriptions. The fields labeled "X" represent Bluetooth SDP fields that are not extracted directly from the UPnP devices and services descriptions, because they do not have a counterpart in the UPnP context. They can be filled in by using standardized properties of the UPnP devices and services. The Bluetooth adapter should be responsible for the information served in the Service Record Handle.

TABLE 2a

| Bluetooth device (bridge) (see Table 2b) | Derived by |
|---|---|
| BD_ADDR | Bridge |

TABLE 2b

| Bluetooth service (UPnP service) | Derived by |
|---|---|
| Service Record Handle (serviceID) | SDP |
| Service Class ID List (serviceType) | SDP |

TABLE 2b-continued

| Bluetooth service (UPnP service) | Derived by |
|---|---|
| Service Record State | Bridge |
| Profile Descriptor List | X |
| Browse Group List | X |
| Documentation URL (manufacturerURL) | SDP |
| Icon URL (iconList) | SDP |
| Service Name (friendlyName) | SDP |
| Service Description (modelDescription) | SDP |
| Provider Name (manufacturer) | SDP |

An alternative embodiment maps each UPnP device to a different Bluetooth device with a distinct Bluetooth device address. Another alternative solution is mapping each UPnP device to a Bluetooth service making the UPnP services invisible in the Bluetooth SDP services descriptions.

Assisted by a UPnP profile, in any of these embodiments, the proxy-bridge may fill in the fields standardized in a Bluetooth service description: Service Record Handle, specVersion, URLBase, deviceType, friendlyName, manufacturer, manufacturerURL, modelDescription, modelName, modelNumber, modelURL, serialNumber, UDN, UPC, iconList, serviceList, deviceList, presentationURL.

Device and Service Announcer

The announcer 224 is responsible for advertising a newly discovered service to the corresponding community and for listening to any inquiry for service information. The UPnP system enables two mechanisms of advertising a service: to initiate advertisement or to listen to any device or service inquiry from interested control points. In a preferred embodiment, available services are advertised at time points selectable by the bridge. In an alternative embodiment, available services are advertised as soon as they have been discovered, so that they become available to the other community immediately. The preferred embodiment makes that the dynamics in both networks will not influence each other. The announcer 224 will advertise the converted Bluetooth services located in the table T.UPdevice using UPnP SSDP periodically. Alternatively or additionally, the announcer 224 will listen continuously to any UPnP control-point inquiry for device description that is located in the table T.UPdevice or service descriptions that are located in the table T.UPservice. Furthermore, the Bluetooth system does not have a service advertisement mechanism. The only way to advertise a service is by listening to any Bluetooth client inquiry. The announcer 224 implements Bluetooth SDP application profile that enables a Bluetooth client to browse or search particular services registered in the proxy. The announcer 224 will reply to the Bluetooth client inquiry based on the service list located in the table T.BTservice. The device and service announcer can announce disappearance of a Bluetooth device to the UPnP community by transmitting an SSDP:byebye message. Preferably, the SSDP:byebye message is only sent after a predefined time interval. This has the advantage that the message is not sent if the Bluetooth device has re-appeared before the end of the time interval. In this case, UPnP devices need not be aware of the relatively short disappearance of the Bluetooth device.

Database

The database 212 has five functional tables as shown in FIG. 4. The table T.UPdevice contains current information of embedded (converted Bluetooth) devices in the proxy. The fields of this table correspond with necessary and/or optional parameters in the UPnP device description. This table is maintained by the converter 222 (see the converter section) and used by the announcer 224 (see the announcer section).

The table T.UPservice represents UPnP service descriptions of (converted Bluetooth) services. The fields of this table correspond with necessary and/or optional parameters in the UPnP service description. This table is maintained by the converter 222 (see the converter section) and used by the announcer 224 (see the announcer section). The T.UPdevice and T.UPservice have a particular relation, namely each service (in T.UPservice) should be related to a device (in T.UPdevice). The table T.BTservice contains a Bluetooth service-record list of which each record corresponds with (UPnP device) service. The fields of this table correspond with necessary and/or optional parameters in the Bluetooth service attributes. This table is maintained by the converter 222 (see the converter section) and used by the announcer 224 (see the announcer section). The table T.BT2UPnP contains information needed for a Bluetooth client to invoke any action of a UPnP service. The fields of this table are shown in Table 3. This table is maintained by the converter 222 (see the converter section) and used by the Bluetooth adapter 226 (see the Bluetooth adapter section). The table T.UPnP2BT contains information that are needed for an UPnP control-point to invoke an action of a Bluetooth service. The fields of this table are shown in Table 4. This table is maintained by the converter 222 (see the converter section) and used by the UPnP adapter 228 (see the UPnP adapter section).

TABLE 3

T.UPnP2BT (UPnP service) ControlURL
(UPnP) ServiceType
(UPnP) ActionName
(UPnP) ArgumentName
(UPnP) VariableName
Bluetooth Address (BADDR)
Bluetooth ProfileName
Bluetooth ActionName (Profile's primitive)
Bluetooth ArgumentName
Bluetooth VariableName

TABLE 4

T.BT2UPnP

Bluetooth ProfileName
Bluetooth ActionName (Profile's primitive)
Bluetooth ArgumentName
Bluetooth VariableName
(UPnP) ControlURL
(UPnP) ServiceType
(UPnP) ActionName
(UPnP) ArgumentName
(UPnP) VariableName Bluetooth Adapter The Bluetooth adapter 226 has four functions. Firstly, it listens to a Bluetooth client's invocation for a UPnP service. Secondly, it listens to a Bluetooth client's inquiry relating to a UPnP service state variable. Thirdly, it can subscribe to any UPnP service event. Finally, it receives notification of a UPnP service variable change (i.e., receiving event). From the table T.BT2UPnP, the Bluetooth adapter 226 can query necessary information to invoke a UPnP service (i.e., ControlURL, ServiceType, ActionName and ArgumentName) and to query a state variable (i.e., ControlURL and VariableName). Upon receiving event notification, depending on the Bluetooth application implementation it will notify the changed variable to the corresponding Bluetooth client.

UPnP Adapter

The UPnP adapter 228 has four functions. Firstly, it listens to any UPnP control-point's invocation for invoking any primitive in the Bluetooth service. Secondly, it listens to any UPnP control-point's inquiry for Bluetooth service variable. Thirdly, it listens to any event subscription request of any Bluetooth service. Finally, it notifies a variable change (i.e., UPnP service event) to its service subscribers. Additionally, when a Bluetooth device is discovered by the proxy, the proxy is not required to maintain active connection to that device but when an interested UPnP control point invokes or subscribes to any service in that Bluetooth device, the adapter is responsible to setup an active connection to the appropriate Bluetooth device and to activate the relevant Bluetooth profile or custom application. From the table T.UPnP2BT, the Bluetooth adapter can query necessary information to invoke Bluetooth service (i.e., Bluetooth Address, ProfileName, ActionName, and ArgumentName), to query variable (i.e., Bluetooth Address, ProfileName, and VariableName) and to notify variable change (i.e., Bluetooth Address ProfileName and VariableName). Nevertheless, the success of the mentioned Bluetooth service operations depends on the Bluetooth application or profile implementation.

Figure 6:
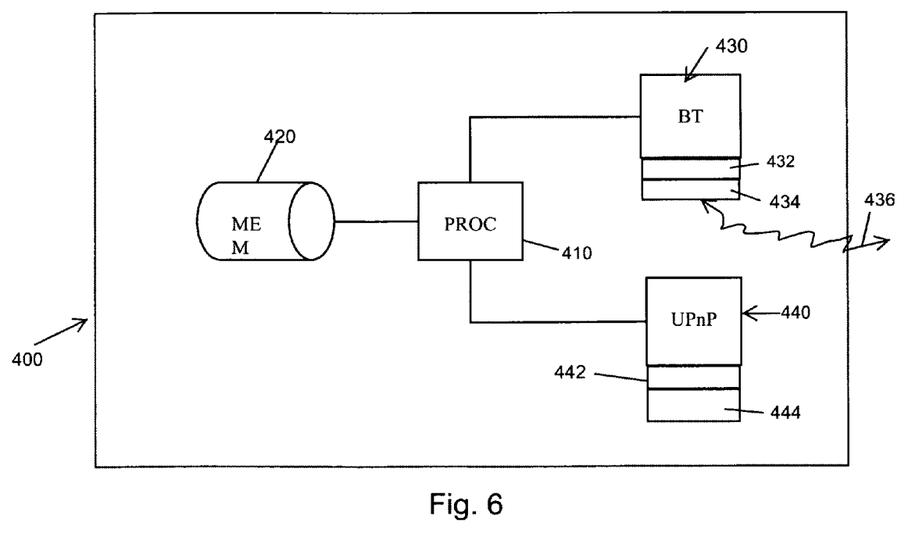
FIG. 6 illustrates an architecture of a proxy-bridge device.

FIG. 6 shows an embodiment of the invention. FIG. 6 shows a diagram of some elements of a device 400, for example a PC, laptop, PDA, mobile phone, smartphone, or a dedicated bridge device. The device 400 has a processor PROC 410 and a memory MEM 420. The system also has a Bluetooth communications subsystem BT 430, comprising a Bluetooth communication stack 432 and physical communication component 434 such as a receiver and a transmitter of Bluetooth signals 436. The device 400 has a UPnP communications system UPnP 440, comprising a TCP/IP communication stack 442 with UPnP support including SSDP, and for example an Ethernet or WLAN adapter 444. The memory 420 is used for storing several tables used in the invention, and for keeping track of the available UPnP and/or Bluetooth devices and services. The memory 420 also contains instructions for detecting Bluetooth and/or UPnP devices and for translating information in UPnP compliant format to and from Bluetooth compliant format.

In an exemplary embodiment, a smartphone based on GSM, GPRS, UMTS or another type of network is equipped with software stored in memory that enables use of the smartphone as a bridge according to the present invention. The smartphone has a Bluetooth interface and is connected to a TCP/IP network. It allows a user to have his or her Bluetooth-enabled headset automatically incorporated in his home network whenever he is at home. The headset can then, for example, be used for playback of music using a MediaCenter. The bridge can also be utilized in other places where IP connectivity exists, and a mobile telephony operator can manage access control remotely and context-aware. For example, when the user (with his PAN based on Bluetooth) walks into the office where he is employed, his PAN automatically gets access to the IP domain of the office. Also, unauthorized devices will be blocked while the PAN is connected to the IP domain of the office.

It will be appreciated that the proxy-bridge of the present invention is equally suitable to connect a non-IP UPnP device. In this case, the TCP/IP communication stack 210 is replaced (or extended) with a different type of communication stack compliant with the non-IP UPnP device, for example L2CAP, if the non-IP UPnP device supports Bluetooth. The UPnP protocol is added on top of the communication stack. The proxy-bridge device thus obtains information about the non-IP UPnP device, distributes this information to the non-UPnP Bluetooth devices, and allows the non-UPnP devices to interact with the non-IP UPnP devices in the way set forth in the prior described examples for IP UPnP devices.

The proxy-bridge could be remotely operated by a mobile telecommunications service provider or an internet service provider, using a mobile telephony network based on for example, GMS, UMTS, GPRS or a network such as Wi-Fi or the Internet. The configuration makes it possible to add easily support for new profiles as they become available. For example, the proxy-bridge could, in first instance, only have information relating to the most popular types (or any collection) of Bluetooth compliant devices. Whenever an unknown type of Bluetooth device/service/profile is found in the piconet, the proxy-bridge accesses the server via the network to obtain the information relevant for making the services provided by the Bluetooth compliant device available to UPnP compliant devices. Thus, the proxy-bridge requires less memory and does not need manual intervention by the user. This mechanism can also be used for uploading and configuring extra, more service specific information needed for accessing, invoking, and using the service. Examples of such information are the pair code for authentication and specific settings for using the devices in a specific context of piconet such as within a company's premises. Various technologies are available on the market that would allow implementing such a remote management platform. For enabling remote management, the proxy-bridge should at least support one of the many possible remote management protocols, such as Simple Network Management Protocol (SNMP) or Customer premises equipment Wide area network Management Protocol (CWMP). It should also contain the data model or management information base as required by the protocol used. The data model should contain the relevant parameters for configuring the relevant functionality of the proxy-bridge remotely. The proxy-bridge of the present invention is also suitable for accommodating a platform for uploading, starting, stopping, etc. of new software modules (such as new profiles), such as the one specified by the Open Service Gateway Initiative.

It will be appreciated that the present invention can be practiced in computer programs stored in electronic device memory or other electronic storage media carrier. The program may be in the form of source code, object code, a code intermediate source and object code such as partially compiled form, or in any other form suitable for use in the implementation of the method according to the invention. The carrier may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means from one storage device to another. When the program is embodied in such a signal, the carrier may be constituted by such cable or other device or means. Alternatively, the carrier may be an integrated circuit in which the program is embedded, the integrated circuit being adapted for performing, or for use in the performance of the relevant method.

It should be noted that the above-mentioned embodiments illustrate rather than limit the invention, and that those skilled in the art will be able to design many alternative embodiments without departing from the scope of the appended claims. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claim enumerating several elements, several of these may be embodied by one and the same item of hardware. The mere fact that certain measures are recited in mutually different dependent claims does not indicate that a combination of these measures cannot be used to advantage.

Although various embodiments which incorporate the teachings of the present invention have been shown and described in detail herein, those skilled in the art can readily devise many other varied embodiments that still incorporate these teachings.

What is claimed is:

1. A proxy-bridge for coupling UPnP compliant devices with Bluetooth compliant devices, comprising:
    a first communication stack for communication with UPnP compliant devices, the first communication stack including SSDP support for discovery of available UPnP complaint devices and services;
    a second communication stack for communication with Bluetooth compliant devices in a piconet, the second communication stack including a Bluetooth SDP client for discovery of available Bluetooth devices and available Bluetooth services, and including a Bluetooth SDP server for communicating with Bluetooth SDP clients in the available Bluetooth devices;
    a converter for converting the discovered Bluetooth devices and services into associated UPnP device and service information, in dependence on respective profiles of the discovered Bluetooth devices and services and on predefined properties associated with the profiles, and for converting the discovered UPnP compliant devices and services into associated Bluetooth device, service, and/or profile information;
    a device and service announcer arranged for distributing the associated UPnP device and service information to UPnP devices by advertising at regular intervals, and arranged for distributing the associated Bluetooth device and service information via the Bluetooth SDP server;
    a UPnP adapter for representing the Bluetooth devices towards the UPnP devices, thereby converting and forwarding messages relating to invocations and service state variables between the UPnP device and the Bluetooth device, based on an output of the converter; and
    a Bluetooth adapter arranged for representing the UPnP compliant devices towards the Bluetooth compliant devices, thereby converting and forwarding messages relating to invocations from the Bluetooth compliant devices to the UPnP compliant devices, and converting and forwarding messages relating to service state variables from the UPnP compliant devices to the Bluetooth compliant devices using the output of the converter.

2. The proxy-bridge according to claim 1, further comprising:
    a device and service discoverer for regularly causing the Bluetooth SDP client to poll for the presence of the available Bluetooth devices and the available Bluetooth services.

3. The proxy-bridge according to claim 1, further comprising:
    an input for receiving from a server via a network information relating to at least one of: the profiles, UPnP standard devices and services, or the use of Bluetooth services and UPnP services.

4. The proxy-bridge according to claim 1, further comprising a discoverer for discovering that at least one of the Bluetooth compliant devices is no longer available; and wherein the device and service announcer distributes UPnP unavailability information after the at least one of the Bluetooth devices has become unavailable.

5. The proxy-bridge according to claim 1, wherein the converter hierarchically represents a plurality of the available Bluetooth devices and/or services as a plurality of associated UPnP devices and/or services within a single UPnP root device.

6. The proxy-bridge according to claim 1, further comprising a discoverer for discovering that at least one of the UPnP devices is no longer available; wherein the device and service announcer times out invocations from the Bluetooth compliant devices corresponding to a service of the at least one of the UPnP devices that is no longer available.

7. The proxy-bridge according to claim 1, wherein the converter hierarchically represents a plurality of the available UPnP devices and/or services as a plurality of associated Bluetooth services, each having one or more Bluetooth device identifiers.

8. A method for connecting UPnP compliant devices with Bluetooth compliant devices, comprising:
discovering available Bluetooth devices and available Bluetooth services;
converting the discovered Bluetooth devices and services into associated UPnP device and service information, also in dependence on respective profiles of the discovered Bluetooth devices and services and on predefined properties associated with the profiles;
distributing the associated UPnP device and service information by advertising at regular intervals;
representing the Bluetooth devices towards the UPnP devices, thereby converting and forwarding messages relating to invocations and service state variables between the UPnP device and the Bluetooth device, based on an output of the converting;
discovering available UPnP compliant devices and services;
converting the discovered UPnP compliant devices and services into associated Bluetooth device, service, and/or profile information;
distributing the associated Bluetooth device and service information via the Bluetooth SDP server; and
representing the UPnP compliant devices towards the Bluetooth compliant devices, thereby converting and forwarding messages relating to invocations from the Bluetooth compliant devices UPnP compliant devices, and converting and forwarding messages relating to service state variables from the UPnP compliant devices to the Bluetooth compliant devices using the output of the converter.

9. A computer program for connecting UPnP compliant devices with Bluetooth compliant devices, comprising software code stored on electronic storage media that when run by a device processor performs the following steps:
discovering available Bluetooth devices and available Bluetooth services;
converting the discovered Bluetooth devices and services into associated UPnP device and service information, also in dependence on respective profiles of the discovered Bluetooth devices and services and on predefined properties associated with the profiles;
distributing the associated UPnP device and service information by advertising at regular intervals;
representing the Bluetooth devices towards the UPnP devices, thereby converting and forwarding messages relating to invocations and service state variables between the UPnP device and the Bluetooth device, based on an output of the converting;
discovering available UPnP compliant devices and services;
converting the discovered UPnP compliant devices and services into associated Bluetooth device, service, and/or profile information;
distributing the associated Bluetooth device and service information via the Bluetooth SDP server; and
representing the UPnP compliant devices towards the Bluetooth compliant devices, thereby converting and forwarding messages relating to invocations from the Bluetooth compliant devices to the UPnP compliant devices, and converting and forwarding messages relating to service state variables from the UPnP compliant devices to the Bluetooth compliant devices using the output of the converter.

* * * * *